US012603368B2

(12) United States Patent
Isaka et al.

(10) Patent No.: US 12,603,368 B2
(45) Date of Patent: Apr. 14, 2026

(54) MEMBER FOR NONAQUEOUS ELECTROLYTE BATTERIES

(71) Applicant: DAIKIN INDUSTRIES, LTD., Osaka (JP)

(72) Inventors: Tadaharu Isaka, Osaka (JP); Hayato Tsuda, Osaka (JP); Yumi Zenke, Osaka (JP); Yukari Yamamoto, Osaka (JP); Takahisa Aoyama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 821 days.

(21) Appl. No.: 17/679,765

(22) Filed: Feb. 24, 2022

(65) Prior Publication Data

US 2022/0278403 A1    Sep. 1, 2022

Related U.S. Application Data

(63) Continuation of application No. PCT/JP2020/032237, filed on Aug. 26, 2020.

(30) Foreign Application Priority Data

Aug. 26, 2019    (JP) ................................. 2019-153773
Mar. 6, 2020    (JP) ................................. 2020-038598

(51) Int. Cl.
*C08F 214/26* (2006.01)
*H01M 50/193* (2021.01)

(52) U.S. Cl.
CPC ....... *H01M 50/193* (2021.01); *C08F 214/262* (2013.01)

(58) Field of Classification Search
CPC ........................... H01M 50/193; C08F 214/26
See application file for complete search history.

(56) References Cited

U.S. PATENT DOCUMENTS

| | | | |
|---|---|---|---|
| 3,635,926 A | 1/1972 | Gresham et al. |
| 3,945,786 A | 3/1976 | Bishop |
| 4,029,868 A | 6/1977 | Carlson |
| 4,262,101 A | 4/1981 | Hartwimmer et al. |
| 4,414,356 A | 11/1983 | Michel |
| 4,510,300 A | 4/1985 | Levy |
| 4,743,658 A | 5/1988 | Imbalzano et al. |
| 4,902,444 A | 2/1990 | Kolouch |

(Continued)

FOREIGN PATENT DOCUMENTS

| | | |
|---|---|---|
| CN | 1599757 A | 3/2005 |
| CN | 103946250 A | 7/2014 |

(Continued)

OTHER PUBLICATIONS

U.S. Appl. No. 17/679,789, filed Feb. 24, 2022, Isaka et al, cont of PCT/JP2020/032238.

(Continued)

*Primary Examiner* — Catherine S Branch
(74) *Attorney, Agent, or Firm* — Sughrue Mion, PLLC

(57) ABSTRACT

A member for a non-aqueous electrolyte battery containing a copolymer containing a tetrafluoroethylene unit and a fluoroalkyl vinyl ether unit, in which the number of functional groups per $10^6$ carbon atoms of a main chain of the copolymer is 100 or less, and a melt flow rate of the copolymer is 20 to 30 g/10 minutes.

7 Claims, 4 Drawing Sheets

(56) References Cited

U.S. PATENT DOCUMENTS

| | | | |
|---|---|---|---|
| 5,000,875 A | 3/1991 | Kolouch | |
| 5,656,392 A | 8/1997 | Sano et al. | |
| 5,767,198 A | 6/1998 | Shimizu et al. | |
| 5,851,693 A | 12/1998 | Sano et al. | |
| 6,066,707 A | 5/2000 | Colaianna et al. | |
| 6,069,215 A | 5/2000 | Araki et al. | |
| 6,096,795 A | 8/2000 | Abusleme et al. | |
| 6,689,833 B1 | 2/2004 | Bidstrup et al. | |
| 6,713,183 B2 | 3/2004 | Araki et al. | |
| 6,740,375 B1 | 5/2004 | Sagisaka et al. | |
| 6,774,196 B1 | 8/2004 | Taira et al. | |
| 11,826,975 B2 | 11/2023 | Imamura et al. | |
| 2002/0011692 A1 | 1/2002 | Lahijani | |
| 2002/0099143 A1 | 7/2002 | Namura | |
| 2002/0167115 A1 | 11/2002 | Tanaka | |
| 2003/0013791 A1 | 1/2003 | Blong et al. | |
| 2003/0109646 A1 | 6/2003 | Kubo et al. | |
| 2003/0114615 A1 | 6/2003 | Sumi et al. | |
| 2003/0190530 A1 | 10/2003 | Yang et al. | |
| 2003/0216531 A1 | 11/2003 | Aten et al. | |
| 2004/0072935 A1 | 4/2004 | Blong et al. | |
| 2004/0102572 A1 | 5/2004 | Kubo et al. | |
| 2004/0204536 A1 | 10/2004 | Miyatani et al. | |
| 2004/0260044 A1 | 12/2004 | Earnest, Jr. et al. | |
| 2005/0020792 A1 | 1/2005 | Aoyama et al. | |
| 2005/0245626 A1 | 11/2005 | Hoaglund et al. | |
| 2007/0112155 A1 | 5/2007 | Takase et al. | |
| 2007/0149734 A1 | 6/2007 | Sakakibara et al. | |
| 2007/0281166 A1 | 12/2007 | Nishio | |
| 2007/0292685 A1 | 12/2007 | Brothers et al. | |
| 2008/0038627 A1 | 2/2008 | Yamauchi et al. | |
| 2008/0114143 A1 | 5/2008 | Brothers et al. | |
| 2008/0241534 A1 | 10/2008 | Ohtani et al. | |
| 2009/0038821 A1 | 2/2009 | Sato et al. | |
| 2009/0044965 A1 | 2/2009 | Kono et al. | |
| 2009/0176952 A1 | 7/2009 | Funaki et al. | |
| 2009/0246435 A1 | 10/2009 | Shimono et al. | |
| 2010/0063214 A1 | 3/2010 | Kasahara et al. | |
| 2010/0212929 A1 | 8/2010 | Ishii et al. | |
| 2010/0273047 A1 | 10/2010 | Kunoike et al. | |
| 2010/0314153 A1 | 12/2010 | Ishii et al. | |
| 2010/0314154 A1 | 12/2010 | Kitahara et al. | |
| 2011/0052970 A1 | 3/2011 | Kurata et al. | |
| 2011/0052977 A1 | 3/2011 | Kurata et al. | |
| 2011/0104562 A1* | 5/2011 | Byun | H01M 50/176 |
| | | | 429/181 |
| 2011/0203830 A1 | 8/2011 | Kono et al. | |
| 2011/0272173 A1 | 11/2011 | Shiotsuki et al. | |
| 2012/0035329 A1 | 2/2012 | Isogai et al. | |
| 2012/0064273 A1 | 3/2012 | Bacino | |
| 2012/0094169 A1 | 4/2012 | Kim et al. | |
| 2013/0046058 A1 | 2/2013 | Pham et al. | |
| 2013/0130100 A1 | 5/2013 | Kurata et al. | |
| 2014/0227533 A1 | 8/2014 | Murakami et al. | |
| 2014/0287177 A1 | 9/2014 | Suda et al. | |
| 2014/0378616 A1 | 12/2014 | Nakano et al. | |
| 2015/0041145 A1 | 2/2015 | Colaianna et al. | |
| 2015/0148481 A1 | 5/2015 | Brothers et al. | |
| 2015/0158988 A1 | 6/2015 | Sawaki et al. | |
| 2015/0353700 A1 | 12/2015 | Isaka et al. | |
| 2016/0006004 A1 | 1/2016 | Ogawa et al. | |
| 2016/0078979 A1 | 3/2016 | Hosoda et al. | |
| 2016/0108159 A1 | 4/2016 | Sekiguchi et al. | |
| 2016/0194491 A1 | 7/2016 | Taguchi et al. | |
| 2016/0272805 A1 | 9/2016 | Nakanishi et al. | |
| 2016/0319089 A1 | 11/2016 | Imamura et al. | |
| 2016/0322128 A1 | 11/2016 | Imamura et al. | |
| 2017/0008986 A1 | 1/2017 | Isaka et al. | |
| 2017/0025204 A1 | 1/2017 | Chapman et al. | |
| 2017/0154707 A1 | 6/2017 | Abe et al. | |
| 2017/0214037 A1 | 7/2017 | Uematsu et al. | |
| 2017/0260344 A1* | 9/2017 | Imamura | C08F 214/262 |
| 2018/0009204 A1 | 1/2018 | Higuchi et al. | |
| 2018/0036931 A1 | 2/2018 | Higuchi et al. | |
| 2018/0237566 A1 | 8/2018 | Aida et al. | |
| 2018/0265654 A1 | 9/2018 | Imamura et al. | |
| 2018/0283590 A1 | 10/2018 | Yokoyama et al. | |
| 2019/0134939 A1 | 5/2019 | Colaianna et al. | |
| 2019/0143628 A1 | 5/2019 | Colaianna et al. | |
| 2019/0177453 A1 | 6/2019 | Isaka et al. | |
| 2019/0193315 A1 | 6/2019 | Miyamoto et al. | |
| 2019/0375929 A1 | 12/2019 | Nishimura et al. | |
| 2019/0382544 A1 | 12/2019 | Yokotani et al. | |
| 2020/0332037 A1 | 10/2020 | Isaka et al. | |
| 2021/0008827 A1 | 1/2021 | Colaianna et al. | |
| 2021/0008828 A1 | 1/2021 | Colaianna et al. | |
| 2021/0024709 A1 | 1/2021 | Fukushima et al. | |
| 2021/0024769 A1 | 1/2021 | Imamura et al. | |
| 2021/0189031 A1 | 6/2021 | Hintzer et al. | |
| 2021/0269568 A1 | 9/2021 | Imamura et al. | |
| 2022/0001657 A1 | 1/2022 | Kikuchi et al. | |
| 2022/0033636 A1 | 2/2022 | Nishimura et al. | |
| 2022/0170573 A1 | 6/2022 | Imamura et al. | |
| 2022/0181689 A1 | 6/2022 | Isaka et al. | |
| 2022/0181698 A1 | 6/2022 | Isaka et al. | |
| 2022/0181729 A1 | 6/2022 | Isaka et al. | |
| 2022/0195088 A1 | 6/2022 | Imamura et al. | |
| 2022/0213996 A1 | 7/2022 | Imamura et al. | |
| 2022/0266485 A1 | 8/2022 | Tsuda et al. | |
| 2023/0227594 A1 | 7/2023 | Yamamoto et al. | |
| 2023/0235107 A1 | 7/2023 | Isaka et al. | |
| 2023/0235159 A1 | 7/2023 | Isaka et al. | |
| 2023/0235160 A1 | 7/2023 | Isaka et al. | |
| 2023/0238627 A1 | 7/2023 | Isaka et al. | |
| 2023/0238628 A1 | 7/2023 | Zenke et al. | |
| 2023/0238629 A1 | 7/2023 | Isaka et al. | |
| 2023/0272136 A1 | 8/2023 | Zenke et al. | |
| 2023/0295356 A1 | 9/2023 | Isaka et al. | |
| 2023/0344077 A1 | 10/2023 | Qiu et al. | |
| 2023/0383031 A1 | 11/2023 | Isaka et al. | |
| 2023/0383032 A1 | 11/2023 | Isaka et al. | |
| 2023/0383033 A1 | 11/2023 | Zenke et al. | |
| 2023/0383034 A1 | 11/2023 | Isaka et al. | |
| 2023/0390977 A1 | 12/2023 | Hamada et al. | |
| 2023/0390978 A1 | 12/2023 | Tsuda et al. | |
| 2023/0390979 A1 | 12/2023 | Tsuda et al. | |
| 2023/0390980 A1 | 12/2023 | Tsuda et al. | |
| 2023/0390981 A1 | 12/2023 | Tsuda et al. | |
| 2023/0391909 A1 | 12/2023 | Isaka et al. | |
| 2023/0391910 A1 | 12/2023 | Isaka et al. | |
| 2023/0391911 A1 | 12/2023 | Isaka et al. | |
| 2023/0391912 A1 | 12/2023 | Isaka et al. | |
| 2023/0391917 A1 | 12/2023 | Isaka et al. | |
| 2023/0391920 A1 | 12/2023 | Isaka et al. | |
| 2023/0391927 A1 | 12/2023 | Isaka | |
| 2023/0391929 A1 | 12/2023 | Isaka et al. | |
| 2023/0391931 A1 | 12/2023 | Isaka et al. | |
| 2023/0391932 A1 | 12/2023 | Isaka et al. | |
| 2023/0391933 A1 | 12/2023 | Isaka et al. | |
| 2023/0392737 A1 | 12/2023 | Tsuda et al. | |
| 2023/0395282 A1 | 12/2023 | Isaka et al. | |
| 2023/0399431 A1 | 12/2023 | Isaka et al. | |
| 2023/0399432 A1 | 12/2023 | Isaka et al. | |
| 2023/0399438 A1 | 12/2023 | Isaka et al. | |
| 2023/0399441 A1 | 12/2023 | Isaka et al. | |
| 2023/0399443 A1 | 12/2023 | Isaka et al. | |
| 2023/0406975 A1 | 12/2023 | Isaka et al. | |
| 2023/0406976 A1 | 12/2023 | Isaka et al. | |
| 2023/0411751 A1 | 12/2023 | Tsuda et al. | |
| 2023/0415387 A1 | 12/2023 | Hamada et al. | |
| 2025/0002728 A1 | 1/2025 | Zenke et al. | |
| 2025/0011488 A1 | 1/2025 | Isaka et al. | |
| 2025/0011490 A1 | 1/2025 | Isaka et al. | |
| 2025/0011494 A1 | 1/2025 | Isaka et al. | |
| 2025/0011496 A1 | 1/2025 | Yamamoto et al. | |
| 2025/0011498 A1 | 1/2025 | Isaka et al. | |
| 2025/0011499 A1 | 1/2025 | Isaka et al. | |
| 2025/0011500 A1 | 1/2025 | Isaka et al. | |

(56) References Cited

U.S. PATENT DOCUMENTS

| | | | |
|---|---|---|---|
| 2025/0019476 A1 | 1/2025 | Isaka et al. | |
| 2025/0034302 A1 | 1/2025 | Isaka et al. | |

FOREIGN PATENT DOCUMENTS

| CN | 107428144 A | 12/2017 |
|---|---|---|
| CN | 109476061 A | 3/2019 |
| CN | 110712348 A | 1/2020 |
| CN | 110790854 A | 2/2020 |
| CN | 114223086 A | 3/2022 |
| CN | 114258609 A | 3/2022 |
| CN | 116390957 A | 7/2023 |
| CN | 116867821 A | 10/2023 |
| CN | 116917346 A | 10/2023 |
| EP | 0 220 910 A2 | 5/1987 |
| EP | 0 423 995 A1 | 4/1991 |
| EP | 0 976 544 A1 | 2/2000 |
| EP | 1 462 458 A1 | 9/2004 |
| EP | 3 816 214 A1 | 5/2021 |
| EP | 4 024 550 A1 | 7/2022 |
| EP | 4 024 575 A1 | 7/2022 |
| EP | 4 223 793 A1 | 8/2023 |
| EP | 4 223 794 A1 | 8/2023 |
| GB | 1210794 A | 10/1970 |
| JP | 48-20788 B1 | 6/1973 |
| JP | 58-132512 A | 8/1983 |
| JP | 58-191127 A | 11/1983 |
| JP | 59-120433 A | 7/1984 |
| JP | 62-104822 A | 5/1987 |
| JP | 62-53019 B2 | 11/1987 |
| JP | 1-53167 B2 | 11/1989 |
| JP | 2-129253 A | 5/1990 |
| JP | 3-184209 A | 8/1991 |
| JP | 3-247609 A | 11/1991 |
| JP | 4-357398 A | 12/1992 |
| JP | 6-1902 A | 1/1994 |
| JP | 6-40813 B2 | 6/1994 |
| JP | 6-287405 A | 10/1994 |
| JP | 7-16869 A | 1/1995 |
| JP | 7-112449 A | 5/1995 |
| JP | 7-188337 A | 7/1995 |
| JP | 7-290496 A | 11/1995 |
| JP | 8-207106 A | 8/1996 |
| JP | 8-321287 A | 12/1996 |
| JP | 9-245832 A | 9/1997 |
| JP | 10-87746 A | 4/1998 |
| JP | 10-158456 A | 6/1998 |
| JP | 10-275604 A | 10/1998 |
| JP | 10-292054 A | 11/1998 |
| JP | 2001-151825 A | 6/2001 |
| JP | 2001-151826 A | 6/2001 |
| JP | 2001-283907 A | 10/2001 |
| JP | 2001-283921 A | 10/2001 |
| JP | 2002-53620 A | 2/2002 |
| JP | 2002-63934 A | 2/2002 |
| JP | 2002-167488 A | 6/2002 |
| JP | 2003-327770 A | 11/2003 |
| JP | 2003-534940 A | 11/2003 |
| JP | 2004-256406 A | 9/2004 |
| JP | 2004-534131 A | 11/2004 |
| JP | 2005-523979 A | 8/2005 |
| JP | 2005-298659 A | 10/2005 |
| JP | 2005-320497 A | 11/2005 |
| JP | 2006-117912 A | 5/2006 |
| JP | 2006-312736 A | 11/2006 |
| JP | 2007-238960 A | 9/2007 |
| JP | 2008-66254 A | 3/2008 |
| JP | 2009-42478 A | 2/2009 |
| JP | 2009-59690 A | 3/2009 |
| JP | 2009-235564 A | 10/2009 |
| JP | 2009-272207 A | 11/2009 |
| JP | 2010-56079 A | 3/2010 |
| JP | 2010-509443 A | 3/2010 |
| JP | 2010-85741 A | 4/2010 |
| JP | 2010-162817 A | 7/2010 |
| JP | 2010-235667 A | 10/2010 |
| JP | 2011-48976 A | 3/2011 |
| JP | 2011-71104 A | 4/2011 |
| JP | 2012-54269 A | 3/2012 |
| JP | 2012-80911 A | 4/2012 |
| JP | 2012-106494 A | 6/2012 |
| JP | 2012-130557 A | 7/2012 |
| JP | 2013-71341 A | 4/2013 |
| JP | 2013-82888 A | 5/2013 |
| JP | 2013-177574 A | 9/2013 |
| JP | 2014-28951 A | 2/2014 |
| JP | 2014-59052 A | 4/2014 |
| JP | 2014-187040 A | 10/2014 |
| JP | 2015-7218 A | 1/2015 |
| JP | 2015-519410 A | 7/2015 |
| JP | 2015-147924 A | 8/2015 |
| JP | 2015-168840 A | 9/2015 |
| JP | 2016-537499 A | 12/2016 |
| JP | 2017-197690 A | 11/2017 |
| JP | 2018-20468 A | 2/2018 |
| JP | 2018-514598 A | 6/2018 |
| JP | 2018-523272 A | 8/2018 |
| JP | 2018-159090 A | 10/2018 |
| JP | 2019-172962 A | 10/2019 |
| JP | 2019-210420 A | 12/2019 |
| JP | 2019-214641 A | 12/2019 |
| JP | 2020-2341 A | 1/2020 |
| JP | 2020-15906 A | 1/2020 |
| JP | 2020-29042 A | 2/2020 |
| JP | 2020-100823 A | 7/2020 |
| JP | 2020-100843 A | 7/2020 |
| JP | 2021-6648 A | 1/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2013-0069652 A1 | 6/2013 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2019/187725 A1 | 10/2019 |
| WO | 2019/189316 A1 | 10/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039865 A1 | 3/2021 |
| WO | 2021039864 A1 | 3/2021 |
| WO | 2021/059753 A1 | 4/2021 |
| WO | 2022/181225 A1 | 9/2022 |
| WO | 2022/181231 A1 | 9/2022 |
| WO | 2022/181232 A1 | 9/2022 |

OTHER PUBLICATIONS

U.S. Appl. No. 17/679,831, filed Feb. 24, 2022, Isaka et al, cont of PCT/JP2020/032239.

U.S. Appl. No. 17/679,818, filed Feb. 22, 2022, Isaka et al, cont of PCT/JP2020/032236.

U.S. Appl. No. 17/680,911, filed Feb. 25, 2022, Tsuda et al, cont of PCT/JP2020/032234.

(56)  References Cited

OTHER PUBLICATIONS

International Search Report issued Oct. 13, 2020 in International Application No. PCT/JP2020/032236.
International Search Report issued Oct. 13, 2020 in International Application No. PCT/JP2020/032237.
International Search Report issued Oct. 13, 2020 in International Application No. PCT/JP2020/032238.
International Search Report issued Oct. 13, 2020 in International Application No. PCT/JP2020/032239.
U.S. Appl. No. 17/679,818, filed Feb. 24, 2022, Isaka, et al., cont of PCT/JP2020/032236.
U.S. Appl. No. 18/191,412, filed Mar. 28, 2023, Isaka, et al., cont of PCT/JP2021/036301.
U.S. Appl. No. 18/191,461, filed Mar. 28, 2023, Zenke, et al., cont of PCT/JP2021/036302.
U.S. Appl. No. 18/192,020, filed Mar. 29, 2023, Isaka, et al., cont of PCT/JP2021/036303.
U.S. Appl. No. 18/192,053, filed Mar. 29, 2023, Isaka, et al., cont of PCT/JP2021/036304.
U.S. Appl. No. 18/192,101, filed Mar. 29, 2023, Yamamoto, et al., cont of PCT/JP2021/036305.
U.S. Appl. No. 18/191,996, filed Mar. 29, 2023, Tsuda, et al., cont of PCT/JP2021/036306.
U.S. Appl. No. 18/192,052, filed Mar. 29, 2023, Zenke, et al., cont of PCT/JP2021/036307.
U.S. Appl. No. 18/192,011, filed Mar. 29, 2023, Isaka, et al., cont of PCT/JP2021/036308.
U.S. Appl. No. 18/192,077, filed Mar. 29, 2023, Isaka, et al., cont of PCT/JP2021/036309.
U.S. Appl. No. 18/192,298, filed Mar. 29, 2023, Isaka, et al., cont of PCT/JP2021/036310.
U.S. Appl. No. 18/453,775, filed Aug. 22, 2023, Tsuda, et al., cont of PCT/JP2022/007735.
U.S. Appl. No. 18/453,690, filed Aug. 22, 2023, Tsuda, et al., cont of PCT/JP2022/007737.
U.S. Appl. No. 18/452,806, filed Aug. 21, 2023, Tsuda, et al., cont of PCT/JP2022/007738.
U.S. Appl. No. 18/450,642, filed Aug. 16, 2023, Isaka, et al., cont of PCT/JP2022/003634.
U.S. Appl. No. 18/448,291, filed Aug. 11, 2023, Isaka, et al., cont of PCT/JP2022/003635.
U.S. Appl. No. 18/449,061, filed Aug. 14, 2023, Isaka, et al., cont of PCT/JP2022/003636.
U.S. Appl. No. 18/448,234, filed Aug. 11, 2023, Isaka, et al., cont of PCT/JP2022/003637.
U.S. Appl. No. 18/453,363, filed Aug. 22, 2023, Isaka, et al., cont of PCT/JP2022/003638.
U.S. Appl. No. 18/449,788, filed Aug. 15, 2023, Isaka, et al., cont of PCT/JP2022/003640.
U.S. Appl. No. 18/451,502, filed Aug. 17, 2023, Isaka, et al., cont of PCT/JP2022/003641.
U.S. Appl. No. 18/450,590, filed Aug. 16, 2023, Tsuda, et al., cont of PCT/JP2022/003642.
U.S. Appl. No. 18/450,094, filed Aug. 15, 2023, Hamada, et al., cont of PCT/JP2022/003643.
U.S. Appl. No. 18/449,845, filed Aug. 15, 2023, Zenke, et al., cont of PCT/JP2022/003644.
U.S. Appl. No. 18/446,746, filed Aug. 9, 2023, Isaka, et al., cont of PCT/JP2022/003645.
U.S. Appl. No. 18/450,491, filed Aug. 16, 2023, Isaka, et al., cont of PCT/JP2022/003646.
U.S. Appl. No. 18/451,525, filed Aug. 17, 2023, Isaka, et al., cont of PCT/JP2022/003647.
U.S. Appl. No. 18/451,455, filed Aug. 17, 2023, Isaka, et al., cont of PCT/JP2022/003468.
U.S. Appl. No. 18/452,107, filed Aug. 18, 2023, Isaka, et al., cont of PCT/JP2022/003649.
U.S. Appl. No. 18/452,146, filed Aug. 18, 2023, Isaka, et al., cont of PCT/JP2022/003650.

U.S. Appl. No. 18/448,341, filed Aug. 11, 2023, Isaka, et al., cont of PCT/JP2022/003651.
U.S. Appl. No. 18/449,778, filed Aug. 15, 2023, Isaka, et al., cont of PCT/JP2022/003652.
U.S. Appl. No. 18/447,877, filed Aug. 10, 2023, Isaka, et al., cont of PCT/JP2022/003653.
U.S. Appl. No. 18/452,908, filed Aug. 21, 2023, Isaka, et al., cont of PCT/JP2022/003654.
U.S. Appl. No. 18/454,141, filed Aug. 23, 2023, Isaka, et al., cont of PCT/JP2022/003657.
U.S. Appl. No. 18/453,709, filed Aug. 22, 2023, Isaka, et al., cont of PCT/JP2022/003658.
U.S. Appl. No. 18/452,769, filed Aug. 21, 2023, Isaka, et al., cont of PCT/JP2022/003659.
U.S. Appl. No. 18/453,810, filed Aug. 22, 2023, Tsuda, et al., cont of PCT/JP2022/003660.
U.S. Appl. No. 18/450,568, filed Aug. 16, 2023, Hamada, et al., cont of PCT/JP2022/003661.
U.S. Appl. No. 18/453,683, filed Aug. 22, 2023, Isaka, et al., cont of PCT/JP2022/003664.
U.S. Appl. No. 18/454,133, filed Aug. 23, 2023, Isaka, et al., cont of PCT/JP2022/003665.
Extended European Search Report issued Aug. 2, 2023 in European Application No. 20857704.9.
International Preliminary Report on Patentability dated Aug. 29, 2023 with a Translation of the Written Opinion of the International Searching Authority in Application No. PCT/JP2022/003634.
International Preliminary Report on Patentability dated Aug. 29, 2023 with a Translation of the Written Opinion of the International Searching Authority in Application No. PCT/JP2022/003635.
International Preliminary Report on Patentability dated Aug. 29, 2023 with a Translation of the Written Opinion of the International Searching Authority in Application No. PCT/JP2022/003636.
International Preliminary Report on Patentability dated Aug. 29, 2023 with a Translation of the Written Opinion of the International Searching Authority in Application No. PCT/JP2022/003637.
International Preliminary Report on Patentability dated Aug. 29, 2023 with a Translation of the Written Opinion of the International Searching Authority in Application No. PCT/JP2022/003638.
International Preliminary Report on Patentability dated Aug. 29, 2023 with a Translation of the Written Opinion of the International Searching Authority in Application No. PCT/JP2022/003640.
International Preliminary Report on Patentability dated Aug. 29, 2023 with a Translation of the Written Opinion of the International Searching Authority in Application No. PCT/JP2022/003641.
International Preliminary Report on Patentability dated Aug. 29, 2023 with a Translation of the Written Opinion of the International Searching Authority in Application No. PCT/JP2022/003642.
International Preliminary Report on Patentability dated Aug. 29, 2023 with a Translation of the Written Opinion of the International Searching Authority in Application No. PCT/JP2022/003643.
International Preliminary Report on Patentability dated Aug. 29, 2023 with a Translation of the Written Opinion of the International Searching Authority in Application No. PCT/JP2022/003644.
International Preliminary Report on Patentability dated Aug. 29, 2023 with a Translation of the Written Opinion of the International Searching Authority in Application No. PCT/JP2022/003645.
International Preliminary Report on Patentability dated Aug. 29, 2023 with a Translation of the Written Opinion of the International Searching Authority in Application No. PCT/JP2022/003646.
International Preliminary Report on Patentability dated Aug. 29, 2023 with a Translation of the Written Opinion of the International Searching Authority in Application No. PCT/JP2022/003647.
International Preliminary Report on Patentability dated Aug. 29, 2023 with a Translation of the Written Opinion of the International Searching Authority in Application No. PCT/JP2022/003648.
International Preliminary Report on Patentability dated Aug. 29, 2023 with a Translation of the Written Opinion of the International Searching Authority in Application No. PCT/JP2022/003649.
International Preliminary Report on Patentability dated Aug. 29, 2023 with a Translation of the Written Opinion of the International Searching Authority in Application No. PCT/JP2022/003650.

(56)                    References Cited

OTHER PUBLICATIONS

International Preliminary Report on Patentability dated Aug. 29, 2023 with a Translation of the Written Opinion of the International Searching Authority in Application No. PCT/JP2022/003651.
International Preliminary Report on Patentability dated Aug. 29, 2023 with a Translation of the Written Opinion of the International Searching Authority in Application No. PCT/JP2022/003652.
International Preliminary Report on Patentability dated Aug. 29, 2023 with a Translation of the Written Opinion of the International Searching Authority in Application No. PCT/JP2022/003653.
International Preliminary Report on Patentability dated Aug. 29, 2023 with a Translation of the Written Opinion of the International Searching Authority in Application No. PCT/JP2022/003654.
International Preliminary Report on Patentability dated Aug. 29, 2023 with a Translation of the Written Opinion of the International Searching Authority in Application No. PCT/JP2022/003657.
International Preliminary Report on Patentability dated Aug. 29, 2023 with a Translation of the Written Opinion of the International Searching Authority in Application No. PCT/JP2022/003658.
International Preliminary Report on Patentability dated Aug. 29, 2023 with a Translation of the Written Opinion of the International Searching Authority in Application No. PCT/JP2022/003659.
International Preliminary Report on Patentability dated Aug. 29, 2023 with a Translation of the Written Opinion of the International Searching Authority in Application No. PCT/JP2022/003660.
International Preliminary Report on Patentability dated Aug. 29, 2023 with a Translation of the Written Opinion of the International Searching Authority in Application No. PCT/JP2022/003661.
International Preliminary Report on Patentability dated Aug. 29, 2023 with a Translation of the Written Opinion of the International Searching Authority in Application No. PCT/JP2022/003664.
International Preliminary Report on Patentability dated Aug. 29, 2023 with a Translation of the Written Opinion of the International Searching Authority in Application No. PCT/JP2022/003665.
International Preliminary Report on Patentability dated Aug. 29, 2023 with a Translation of the Written Opinion of the International Searching Authority in Application No. PCT/JP2022/007735.
International Preliminary Report on Patentability dated Aug. 29, 2023 with a Translation of the Written Opinion of the International Searching Authority in Application No. PCT/JP2022/007737.
International Preliminary Report on Patentability dated Aug. 29, 2023 with a Translation of the Written Opinion of the International Searching Authority in Application No. PCT/JP2022/007738.
International Preliminary Report on Patentability with Written Opinion dated Mar. 1, 2022 in International Application No. PCT/JP2020/032237.
International Preliminary Report on Patentability with Written Opinion dated Mar. 1, 2022 in International Application No. PCT/JP2020/032236.
International Preliminary Report on Patentability with Written Opinion dated Mar. 1, 2022 in International Application No. PCT/JP2020/032234.
International Preliminary Report on Patentability with Written Opinion dated Mar. 1, 2022 in International Application No. PCT/JP2020/032239.
International Preliminary Report on Patentability with Written Opinion dated Mar. 1, 2022 in International Application No. PCT/JP2020/032238.
International Search Report dated Oct. 6, 2020 in International Application No. PCT/JP2020/032234.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 9, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.

(56)                    References Cited

OTHER PUBLICATIONS

Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.

International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
European Search Report issued Feb. 10, 2025 for European Patent Application No. 22759283.9.
European Search Report issued Feb. 20, 2025 for European Patent Application No. 22759263.1.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.

(56)  References Cited

OTHER PUBLICATIONS

European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.

Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al, "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
Extended European Search Report dated Mar. 11, 2026 in application No. 23 780 928.0.
Extended European Search Report dated Mar. 11, 2026 in application No. 23 780 929.8.
Extended European Search Report dated Mar. 11, 2026 in application No. 23 780 936.3.
Extended European Search Report dated Mar. 11, 2026 in application No. 23 780 953.8.
Extended European Search Report dated Mar. 11, 2026 in application No. 23 780 954.6.
Extended European Search Report dated Mar. 11, 2026 in application No. 23 780 955.3.
Extended European Search Report dated Mar. 11, 2026 in application No. 23 780 932.2.
Extended European Search Report dated Mar. 11, 2026 in application No. 23 780 933.0.
Extended European Search Report dated Mar. 11, 2026 in application No. 23 780 934.8.

* cited by examiner

MEMBER FOR NONAQUEOUS ELECTROLYTE BATTERIES

CROSS-REFERENCE TO RELATED APPLICATIONS

This application is a Rule 53(b) Continuation of International Application No. PCT/JP2020/032237 filed Aug. 26, 2020, which claims priority based on Japanese Patent Application No. 2019-153773 filed Aug. 26, 2019 and Japanese Patent Application No. 2020-038598 filed Mar. 6, 2020, the respective disclosures of which are incorporated herein by reference in their entireties.

TECHNICAL FIELD

The present disclosure relates to a member for a non-aqueous electrolyte battery.

BACKGROUND ART

Tetrafluoroethylene/fluoroalkyl vinyl ether copolymers have favorable insulating characteristics and are thus used for insulating members or the like for batteries.

For example, Patent Document 1 discloses a battery including an exterior can, an electrode group that is accommodated in the exterior can and includes a positive electrode and a negative electrode, a lid that is mounted in an opening portion of the exterior can, a terminal portion of the positive electrode and a terminal portion of the negative electrode, in which at least one of the terminal portion of the positive electrode and the terminal portion of the negative electrode includes a through hole opened in the lid and an insulating gasket having a tubular portion that is intercalated into the through hole of the lid, and the resin that forms the insulating gasket is a tetrafluoroethylene-perfluoroalkyl vinyl ether copolymer.

CITATION LIST

Patent Literature

Patent Literature 1: Japanese Patent Laid-Open No. 2011-48976

SUMMARY

According to the present disclosure, there is provided a member for a non-aqueous electrolyte battery containing a copolymer containing a tetrafluoroethylene unit and a fluoroalkyl vinyl ether unit, in which the number of functional groups per $10^6$ carbon atoms of a main chain of the copolymer is 100 or less, and a melt flow rate of the copolymer is 20 to 30 g/10 minutes.

Effects

According to the present disclosure, it is possible to provide a member for a non-aqueous electrolyte battery that is excellent in resistance to compression set and swelling resistance to non-aqueous electrolytic solutions and, furthermore, does not easily allow fluorine ions to be eluted into non-aqueous electrolytic solutions.

DESCRIPTION OF EMBODIMENTS

Figure 1:
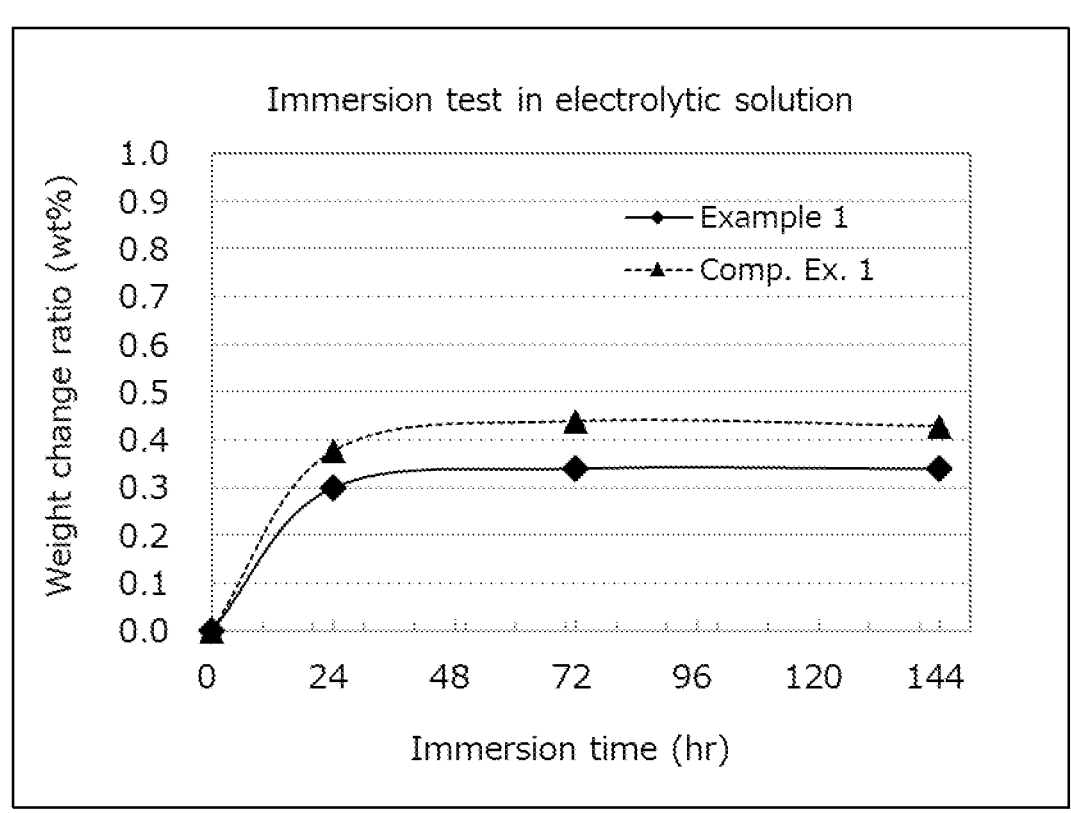
FIG. 1 is a graph of weight change ratios (mass %) measured in immersion tests of test pieces produced in Example 1 and Comparative Example 1 in an electrolytic solution, plotted relative to immersion times (hr).

Hereinafter, specific embodiments of the present disclosure will be described in detail, but the present disclosure is not limited to the following embodiments.

A member for a non-aqueous electrolyte battery of the present disclosure contains a copolymer containing a tetrafluoroethylene unit and a fluoroalkyl vinyl ether (FAVE) unit.

The copolymer contained in the member for a non-aqueous electrolyte battery of the present disclosure is a melt-fabricable fluororesin. Being melt-fabricable means that polymers can be melted and fabricated using a conventional fabricating device such as an extruder or an injection molding device.

FAVE for giving the FAVE unit can be at least one selected from the group consisting of monomers represented by the general formula (1):

$$CF_2\!\!=\!\!CFO(CF_2CFY^1O)_p\!\!-\!\!(CF_2CF_2CF_2O)_qRf \qquad (1)$$

wherein, $Y^1$ represents F or $CF_3$, Rf represents a perfluoroalkyl group having 1 to 5 carbon atoms, p represents an integer of 0 to 5, and q represents an integer of 0 to 5; and monomers represented by the general formula (2):

$$CFX\!\!=\!\!CXOCF_2OR^1 \qquad (2)$$

wherein, Xs are the same or different from each other and each represent H, F or $CF_3$, and $R^1$ represents a linear or branched fluoroalkyl group having 1 to 6 carbon atoms and optionally having one or two atoms of at least one selected from the group consisting of H, Cl, Br and I or a cyclic fluoroalkyl group having 5 or 6 carbon atoms and optionally having one or two atoms of at least one selected from the group consisting of H, Cl, Br and I.

Among them, the FAVE is preferably the monomers represented by the general formula (1), more preferably at least one selected from the group consisting of perfluoro (methyl vinyl ether), perfluoro(ethyl vinyl ether) (PEVE) and perfluoro(propyl vinyl ether) (PPVE), still more preferably at least one selected from the group consisting of PEVE and PPVE and particularly preferably PPVE.

The content of the fluoroalkyl vinyl ether (FAVE) unit in the copolymer is preferably 1.0 to 10.0 mass %, more preferably 2.0 mass % or more, still more preferably 3.0 mass % or more, far still more preferably 3.5 mass % or more, particularly preferably 4.0 mass % or more and most preferably 5.6 mass % or more, and more preferably 8.0 mass % or less, still more preferably 7.0 mass % or less, particularly preferably 6.5 mass % or less and most preferably 6.0 mass % or less, based on all of the monomer units. When the content of the FAVE unit in the copolymer is within the above-described range, excellent resistance to compression set of the member for a non-aqueous electrolyte battery can be obtained.

The content of the tetrafluoroethylene (TFE) unit in the copolymer is preferably 99.0 to 90.0 mass %, more preferably 98.0 mass % or less, still more preferably 97.0 mass % or less, far still more preferably 96.5 mass % or less, particularly preferably 96.0 mass % or less and most preferably 94.4 mass % or less, and more preferably 92.0 mass % or more, still more preferably 93.0 mass % or more, particularly preferably 93.5 mass % or more and most preferably 94.0 mass % or more, based on all of the monomer units. When the content of the TFE unit in the copolymer is within the above-described range, excellent resistance to compression set of the member for a non-aqueous electrolyte battery can be obtained.

In the present disclosure, the content of each monomer unit in the copolymer is measured by the $^{19}$F-NMR method.

The copolymer may also contain a monomer unit derived from a monomer copolymerizable with TFE and FAVE. In this case, the content of the monomer copolymerizable with TFE and FAVE is preferably 0 to 10 mass %, more preferably 0.1 to 2.0 mass % and still more preferably 0.1 to 0.4 mass %, based on all of the monomer units in the copolymer.

Examples of the monomer copolymerizable with TFE and FAVE include HFP, a vinyl monomer represented by $CZ^1Z^2$=$CZ^3(CF_2)_nZ^4$, wherein, $Z^1$, $Z^2$ and $Z^3$ are the same or different from one another and each represent H or F, $Z^4$ represents H, F or Cl, and n represents an integer of 2 to 10, and an alkyl perfluorovinyl ether derivative represented by $CF_2$=$CF$—$OCH_2$—$Rf^1$, wherein, $Rf^1$ represents a perfluoroalkyl group having 1 to 5 carbon atoms. Among them, HFP is preferable.

The copolymer is preferably at least one selected from the group consisting of a copolymer consisting of the TFE unit and the FAVE unit and a TFE/HFP/FAVE copolymer and more preferably a copolymer consisting of the TFE unit and the FAVE unit.

The melting point of the copolymer is preferably 280° C. to 322° C., more preferably 285° C. or higher and still more preferably 295° C. or higher, and more preferably 320° C. or lower, still more preferably 315° C. or lower and particularly preferably 310° C. or lower, in view of heat resistance and stress crack resistance. The melting point can be measured using a differential scanning calorimeter (DSC).

The glass transition temperature (Tg) of the copolymer is preferably 70° C. or higher, more preferably 80° C. or higher, still more preferably 85° C. or higher, far still more preferably 90° C. or higher, particularly preferably 95° C. or higher and most preferably 100° C. or higher. The glass transition temperature can be measured by measuring dynamic viscoelasticity.

The melt flow rate of the copolymer is 20 to 30 g/10 minutes, preferably 21 g/10 minutes or more, more preferably 22 g/10 minutes or more and still more preferably 23 g/10 minutes or more, and preferably 29 g/10 minutes or less, more preferably 28 g/10 minutes or less and still more preferably 27 g/10 minutes or less, in view of achieving a balance between the resistance to compression set and the moldability on a higher level.

In the present disclosure, the melt flow rate is a value that is obtained in terms of the mass of a polymer that flows out from a nozzle having an inner diameter of 2.1 mm and a length of 8 mm per 10 minutes (g/10 minutes) at 372° C. under a load of 5 kg using a melt indexer according to ASTM D1238.

Furthermore, the number of functional groups per $10^6$ carbon atoms of the main chain of the copolymer contained in the member for a non-aqueous electrolyte battery of the present disclosure is 100 or less. Since the member for a non-aqueous electrolyte battery of the present disclosure contains the copolymer having a melt flow rate within the above-described range and also having 100 or less functional groups per $10^6$ carbon atoms of the main chain, the member for a non-aqueous electrolyte battery is excellent in moldability, exhibits a low compression set rate, has excellent swelling resistance to non-aqueous electrolytic solutions, and furthermore, does not easily allow fluorine ions to be eluted into non-aqueous electrolytic solutions.

The number of functional groups per $10^6$ carbon atoms of the main chain of the copolymer is preferably 80 or less, more preferably 50 or less and still more preferably 20 or less, in view of obtaining more excellent resistance to compression set and more excellent swelling resistance to non-aqueous electrolytic solutions and further suppressing the elution of fluorine ions into non-aqueous electrolytic solutions.

Infrared spectroscopy can be used for identifying the functional groups and measuring the number of the functional groups.

Specifically, the number of the functional groups is measured by the following method. First, the copolymer is molded by cold press to produce a film having a thickness of 0.25 to 0.3 mm. This film is analyzed by the Fourier transform infrared spectroscopy to obtain the infrared absorption spectrum of the copolymer, and a differential spectrum between the resulting infrared absorption spectrum and a base spectrum of a completely-fluorinated copolymer with no functional groups is obtained. The number of functional groups per $1\times10^6$ carbon atoms in the copolymer, N, is calculated from the absorption peak of a specific functional group appearing in this differential spectrum according to the following formula (A).

$$N=I\times K/t \tag{A}$$

I: Absorbance
K: Coefficient of correction
t: Thickness of film (mm)

For reference, the absorption frequencies, coefficients of molar absorbance and coefficients of correction of the functional groups in the present disclosure are shown in Table 1. The coefficients of molar absorbance have been determined from the FT-IR measurement data of low-molecular model compounds.

[Table 1]

TABLE 1

| Functional Group | Absorption Frequency (cm$^{-1}$) | Molar Extinction Coefficient | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2$=$CF_2$ |

The absorption frequencies of —CH$_2$CF$_2$H, —CH$_2$COF, —CH$_2$COOH, —CH$_2$COOCH$_3$ and —CH$_2$CONH$_2$ are lower by several tens of kayser (cm$^{-1}$) from the absorption frequencies of —CF$_2$H, —COF, —COOH free and —COOH bonded, —COCCH$_3$ and —CONH$_2$, which are shown in the table, respectively.

Therefore, for example, the number of functional groups —COF is the total of the number of functional groups obtained from an absorption peak at an absorption frequency of 1,883 cm$^{-1}$ assigned to —CF$_2$COF and the number of functional groups obtained from an absorption peak at an absorption frequency of 1,840 cm$^{-1}$ assigned to —CH$_2$COF.

The functional groups are a functional group that is present at a main chain terminal or at a side chain terminal in the copolymer and a functional group that is present in the main chain or in a side chain in the copolymer. The number of functional groups may be the total number of —CF=CF$_2$, —CF$_2$H, —COF, —COOH, —COOCH$_3$, —CONH$_2$ and —CH$_2$OH.

The functional groups are introduced into the copolymer with, for example, a chain transfer agent or a polymerization initiator that is used at the time of producing the copolymer. For example, in a case where an alcohol is used as a chain transfer agent or a peroxide having a structure of —CH$_2$OH is used as a polymerization initiator, —CH$_2$OH is introduced into a main chain terminal in the copolymer. In addition, the functional groups are introduced into side chain terminals in the copolymer by the polymerization of monomers having a functional group.

When such a copolymer having a functional group is subjected to fluorination treatment, it is possible to obtain the copolymer in which the number of functional groups is within the above-described range. In other words, the copolymer contained in the member for a non-aqueous electrolyte battery of the present disclosure is preferably a copolymer that has been subjected to fluorination treatment. The copolymer contained in the member for a non-aqueous electrolyte battery of the present disclosure also preferably has a —CF$_3$ terminal group.

The fluorination treatment can be carried out by contacting a copolymer that has not been subjected to fluorination treatment with a fluorine-containing compound.

The fluorine-containing compound is not limited and can be a fluorine radical source that generates a fluorine radical under a fluorination treatment condition. Examples of the fluorine radical source include F$_2$ gas, CoF$_3$, AgF$_2$, UF$_6$, OF$_2$, N$_2$F$_2$, CF$_3$OF, and a halogen fluoride (for example, IF$_5$ or ClF$_3$).

The fluorine radical source such as F$_2$ gas may have a concentration of 100%, but is preferably used after being diluted to 5 to 50 mass % and more preferably used after being diluted to 15 to 30 mass % by mixing the fluorine radical source with an inert gas, in view of safety. Examples of the inert gas include nitrogen gas, helium gas, and argon gas, and the inert gas is preferably nitrogen gas from an economical viewpoint.

The conditions for the fluorination treatment are not limited. The copolymer in a molten state may be contacted with the fluorine-containing compound, and normally the copolymer can be contacted with the fluorine-containing compound at a temperature of the melting point or lower of the copolymer, preferably 20° C. to 240° C., more preferably 80° C. to 240° C. and still more preferably 100° C. to 220° C. The fluorination treatment is carried out for, ordinarily, 1 to 30 hours and preferably 5 to 25 hours. In the fluorination treatment, a copolymer that has not been subjected to fluorination treatment is preferably contacted with fluorine gas (F$_2$ gas).

The copolymer used in the fluorination treatment can be produced by, for example, a known conventional method including appropriately mixing monomers that serve as constituent units of the copolymer and an additive such as a polymerization initiator and carrying out emulsion polymerization or suspension polymerization.

The member for a non-aqueous electrolyte battery of the present disclosure may also contain other components as necessary. Examples of the other components include a filler, a plasticizer, a pigment, a colorant, an antioxidant, a UV absorber, a flame retarder, an anti-aging agent, an antistatic agent, and an antibacterial agent.

Among them, the other component is preferably a filler. Examples of the filler include silica, kaolin, clay, organic clay, talc, mica, alumina, calcium carbonate, calcium terephthalate, titanium oxide, calcium phosphate, calcium fluoride, lithium fluoride, crosslinked polystyrene, potassium titanate, carbon, boron nitride, a carbon nanotube, and a glass fiber.

As described above, the member for a non-aqueous electrolyte battery of the present disclosure may contain the other components in addition to the copolymer. However, in view of further exhibiting the excellent characteristics of the copolymer sufficiently, the content of the other components is preferably as small as possible, and the other components are most preferably not contained. Specifically, the content of other components are preferably 30 mass % or less, more preferably 10 mass % or less and most preferably 0 mass %, based on the member for a non-aqueous electrolyte battery of the present disclosure. That is, the member for a non-aqueous electrolyte battery of the present disclosure most preferably does not contain any other components. The member for a non-aqueous electrolyte battery of the present disclosure may consist of the copolymer.

The member for a non-aqueous electrolyte battery of the present disclosure can be manufactured by molding the copolymer or a composition containing the copolymer and the other components into a desired shape or size. A method for producing the composition can be a method in which the copolymer and the other components are mixed in a dry manner, and a method in which the copolymer and the other components are mixed in advance with a mixer and then melted and kneaded with a kneader, a melt extruder or the like.

A method for molding the copolymer or the composition is not limited and examples thereof include an injection molding method, an extrusion method, a compression molding method, and a blow molding method. Among them, the compression molding method or the injection molding method is preferable and the injection molding method is more preferable since the member for a non-aqueous electrolyte battery can be produced with high productivity. That is, the member for a non-aqueous electrolyte battery of the present disclosure is preferably a compression molded article or an injection molded article and more preferably an injection molded article since the member for a non-aqueous electrolyte battery can be produced with high productivity.

The member for a non-aqueous electrolyte battery of the present disclosure exhibits a low compression set rate even when deformed at a high compressive deformation rate. The member for a non-aqueous electrolyte battery of the present disclosure can be used in a compressively defamed state at a compressive deformation rate of 10% or more and can be used in a compressively defamed state at a compressive deformation rate of 20% or more or 25% or more. When the member for a non-aqueous electrolyte battery of the present disclosure is used in a defamed state at such a high compressive deformation rate, the member is capable of maintaining certain rebound resilience for a long period of time and therefore maintaining sealing characteristics and insulating characteristics for a long period of time.

The compressive deformation rate refers to a compressive deformation rate at a portion where the compressive deformation rate is highest when the member for a non-aqueous electrolyte battery is used in a compressed state. For example, in a case where a flat member for a non-aqueous electrolyte battery is used in a state where the member is compressed in the thickness direction, the compressive deformation rate refers to the compressive deformation rate in the thickness direction. For example, in a case where the member for a non-aqueous electrolyte battery is used in a state where only a part of the member for a non-aqueous electrolyte battery is compressed, the compressive deformation rate refers to the compressive deformation rate at a portion where the compressive deformation rate is highest, among the compressive deformation rates at compressed portions.

The size or shape of the member for a non-aqueous electrolyte battery of the present disclosure may be appropriate to the use, and is not limited. The shape of the member for a non-aqueous electrolyte battery of the present disclosure may be, for example, cyclic. The member for a non-aqueous electrolyte battery of the present disclosure may have a circular shape, an oval shape, a quadrilateral shape with rounded corners, or the like in planar view, with a through hole in the central portion.

The member for a non-aqueous electrolyte battery of the present disclosure is a member for constituting non-aqueous electrolytic solution batteries. The member for a non-aqueous electrolyte battery of the present disclosure is excellent in swelling resistance to non-aqueous electrolytic solutions and, furthermore, does not easily allow fluorine ions to be eluted into non-aqueous electrolytic solutions, and accordingly, the member is particularly preferable as a member that is used in a state where the member is in contact with non-aqueous electrolytic solutions in non-aqueous electrolytic solution batteries. That is, the member for a non-aqueous electrolyte battery of the present disclosure may have a liquid-contact surface with non-aqueous electrolytic solutions in non-aqueous electrolytic solution batteries.

The member for a non-aqueous electrolyte battery of the present disclosure contains the copolymer having a reduced number of functional groups and thus also exhibits the surprising effect of not easily allowing fluorine ions to be eluted into non-aqueous electrolytic solutions. Therefore, the use of the member for a non-aqueous electrolyte battery of the present disclosure makes it possible to suppress an increase in the concentration of fluorine ions in non-aqueous electrolytic solutions. As a result, the use of the member for a non-aqueous electrolyte battery of the present disclosure makes it possible to suppress the generation of gas such as HF in non-aqueous electrolytic solution batteries or makes it possible to suppress deterioration of the battery performance and shortening of the service lives of non-aqueous electrolytic solution batteries.

In addition, taking into consideration that the member for a non-aqueous electrolyte battery of the present disclosure is capable of further suppressing the generation of gas such as HF in non-aqueous electrolytic solution batteries or capable of further suppressing deterioration of the battery performance and suppressing shortening of the service lives of non-aqueous electrolytic solution batteries, the amount of fluorine ions eluted and detected in an immersion test in an electrolytic solution is preferably 1 ppm or less, preferably 0.8 ppm or less and more preferably 0.7 ppm or less in terms of mass. The immersion test in an electrolytic solution can be carried out by producing a test piece having a weight equivalent to 10 molded articles (15 mm×15 mm×0.2 mm) from the member for a non-aqueous electrolyte battery, putting a glass sample bottle including the test piece and 2 g of dimethyl carbonate (DMC) into a constant-temperature vessel at 80° C., and leaving the sample bottle to stand for 24 to 144 hours (preferably 144 hours).

The non-aqueous electrolyte battery is not limited as long as the battery contains a non-aqueous electrolytic solution, and examples thereof include a lithium ion secondary battery and a lithium ion capacitor. Members that constitute the non-aqueous electrolyte battery include a sealing member and an insulating member.

The non-aqueous electrolytic solution is not limited and one or more of known solvents such as propylene carbonate, ethylene carbonate, butylene carbonate, γ-butyl lactone, 1,2-dimethoxyethane, 1,2-diethoxyethane, dimethyl carbonate, diethyl carbonate and ethyl methyl carbonate can be used. The non-aqueous electrolyte battery may further contain an electrolyte. The electrolyte is not limited and $LiClO_4$, $LiAsF_6$, $LiPF_6$, $LiBF_4$, LiCl, LiBr, $CH_3SO_3Li$, $CF_3SO_3Li$, cesium carbonate or the like can be used.

The member for a non-aqueous electrolyte battery of the present disclosure can be preferably used as, for example, a sealing member such as a sealing gasket or a sealing packing, or an insulating member such as an insulating gasket or an insulating packing. The sealing member refers to a member that is used to prevent the leakage of liquid or gas or the intrusion of liquid or gas from the outside. The insulating member refers to a member that is used to insulate electricity. The member for a non-aqueous electrolyte battery of the present disclosure may be a member that is used for the purpose of both sealing and insulation.

The member for a non-aqueous electrolyte battery of the present disclosure exhibits a low compression set rate even after compressed at a high temperature and thus can be preferably used in environments where temperatures become high. For example, the member for a non-aqueous electrolyte battery of the present disclosure is preferably used in environments where the highest temperature reaches 40° C. or higher.

The member for a non-aqueous electrolyte battery of the present disclosure exhibits a low compression set rate even after compressed at a high temperature, is excellent in swelling resistance to non-aqueous electrolytic solutions, and furthermore, does not easily allow fluorine ions to be eluted into non-aqueous electrolytic solutions, and thus the member can be preferably used as a sealing member for non-aqueous electrolytic solution batteries or an insulating member for non-aqueous electrolytic solution batteries. For example, at the time of charging a battery such as a non-aqueous electrolytic solution secondary battery, there is a case where the temperature of the battery temporarily reaches 40° C. or higher. The member for a non-aqueous electrolyte battery of the present disclosure has high rebound resilience that is not impaired even when the member for a non-aqueous electrolyte battery is used in a deformed state at a high compressive deformation rate and, furthermore, in a state where the member is contacted with non-aqueous electrolytic solutions, in batteries such as a non-aqueous electrolytic solution secondary battery. Therefore, in a case where the member for a non-aqueous electrolyte battery of the present disclosure is used as a sealing member, excellent sealing characteristics are maintained for a long period of time. In addition, the member for a non-aqueous electrolyte battery of the present disclosure contains the copolymer described above and thus has excellent insulating characteristics. Therefore, in a case where the member for a non-aqueous electrolyte battery of the present disclosure is used as an insulating member, the member for a non-aqueous electrolyte battery firmly adheres to two or more electrically conductive members to prevent short-circuiting for a long period of time.

Hereinabove, the embodiments have been described, but it is understood that the embodiments or the details can be modified in a variety of manners without departing from the gist and scope of the claims.

According to the present disclosure, there is provided a member for a non-aqueous electrolyte battery containing a copolymer containing a tetrafluoroethylene unit and a fluoroalkyl vinyl ether unit, in which the number of functional groups per $10^6$ carbon atoms of a main chain of the copolymer is 100 or less, and a melt flow rate of the copolymer is 20 to 30 g/10 minutes.

In the member for a non-aqueous electrolyte battery of the present disclosure, the copolymer preferably has a melting point of 295° C. to 320° C.

In the member for a non-aqueous electrolyte battery of the present disclosure, a content of the fluoroalkyl vinyl ether unit in the copolymer is preferably 1.0 to 10.0 mass % based on all monomer units.

In the member for a non-aqueous electrolyte battery of the present disclosure, the fluoroalkyl vinyl ether unit is preferably a perfluoro(propyl vinyl ether) unit.

The member for a non-aqueous electrolyte battery of the present disclosure can be used in a compressively defamed state at a compressive deformation rate of 10% or more.

The member for a non-aqueous electrolyte battery of the present disclosure preferably has a liquid-contact surface with a non-aqueous electrolytic solution.

In the member for a non-aqueous electrolyte battery of the present disclosure, an amount of fluorine ions eluted and detected in an immersion test in an electrolytic solution is preferably 1 ppm or less.

The member for a non-aqueous electrolyte battery of the present disclosure is preferably an injection molded article.

The member for a non-aqueous electrolyte battery of the present disclosure can be preferably used as a sealing member or an insulating member.

EXAMPLES

Next, the embodiments of the present disclosure will be described by way of examples, but the present disclosure is not limited to these examples.

Individual numerical values in the examples were measured by the following methods.

(Content of Monomer Unit)

The content of each monomer unit was measured with an NMR analyzer (for example, AVANCE 300 high-temperature probe manufactured by Bruker BioSpin K.K.).

(Melt Flow Rate (MFR))

The mass of a polymer that flowed out from a nozzle having an inner diameter of 2.1 mm and a length of 8 mm per 10 minutes (g/10 minutes) at 372° C. under a load of 5 kg was determined using a melt indexer G-01 (manufactured by Toyo Seiki Seisaku-sho, Ltd.) according to ASTM D1238.

(Melting Point)

The melting point was determined as a temperature corresponding to the maximum value in a heat-of-fusion curve when heating a polymer at a rate of 10° C./minute using a differential scanning calorimeter (trade name: X-DSC7000 manufactured by Hitachi High-Tech Science Corporation).

(Number of Functional Groups)

Pellets were molded by cold press to produce a film having a thickness of 0.25 to 0.3 mm. This film was scanned 40 times and analyzed with a Fourier transform infrared spectrometer [FT-IR (Spectrum One, manufactured by PerkinElmer Co., Ltd.)] to obtain an infrared absorption spectrum, and a differential spectrum between the resulting infrared absorption spectrum and a base spectrum of a completely-fluorinated copolymer with no functional groups was obtained. The number of functional groups per $1\times10^6$ carbon atoms, N, in the sample was calculated from the absorption peak of a specific functional group appearing in this differential spectrum using the following formula (A).

$$N=I\times K/t \tag{A}$$

I: Absorbance

K: Coefficient of correction t: Thickness of film (mm)

For reference, the absorption frequencies, coefficients of molar absorbance and coefficients of correction of the functional groups in the present disclosure are shown in Table 2. The coefficients of molar absorbance have been determined from the FT-IR measurement data of low-molecular model compounds.

In the present disclosure, the total of the numbers of —COOH, —COOCH$_3$, —CH$_2$OH, —COF, —CF═CF$_2$, —CONH$_2$ and —CF$_2$H is regarded as the number of functional groups.

TABLE 2

| Functional Group | Absorption Frequency (cm$^{-1}$) | Molar Extinction Coefficient | Correction Factor | Model Compound |
|---|---|---|---|---|
| —COF | 1833 | 600 | 388 | C$_7$F$_{15}$COF |
| —COOH free | 1815 | 530 | 439 | H(CF$_2$)$_6$COOH |
| —COOH bonded | 1779 | 530 | 439 | H(CF$_2$)$_6$COOH |
| —COOCH$_3$ | 1795 | 680 | 342 | C$_7$F$_{15}$COOCH$_3$ |
| —CONH$_2$ | 3436 | 506 | 460 | C$_7$H$_{15}$CONH$_2$ |
| —CH$_2$OH$_2$, —OH | 3648 | 104 | 2236 | C$_7$H$_{15}$CH$_2$OH |
| —CF$_2$H | 3020 | 8.8 | 26485 | H(CF$_2$CF$_2$)$_3$CH$_2$OH |
| —CF═CF$_2$ | 1795 | 635 | 366 | CF$_2$═CF$_2$ |

Example 1

Forty-nine liters of pure water was placed into an autoclave having a capacity of 174 L, and the system was sufficiently purged with nitrogen. After that, 40.7 kg of perfluorocyclobutane, 2.01 kg of perfluoro(propyl vinyl ether) (PPVE) and 3.15 kg of methanol were added, and the system was stirred at a stirring rate of 200 rpm while maintaining a temperature of 35° C. Next, tetrafluoroethylene (TFE) was press-fitted at up to 0.64 MPa, and then 0.041 kg of a 50% di-n-propyl peroxydicarbonate solution in methanol was added to initiate polymerization. Since the pressure in the system decreased as the polymerization proceeded, TFE was continuously supplied to keep the pressure constant, and 0.059 kg of PPVE was added each time when 1 kg of TFE was supplied to continue the polymerization for 19 hours. After releasing to return to the atmospheric pressure, the reaction product obtained was washed with water and dried, thereby obtaining 30 kg of a powder.

The obtained powder was melt-extruded at 360° C. with a screw extruder (trade name: PCM46 manufactured by Ikegai Corp) to obtain pellets.

The content of PPVE was measured on the obtained pellets by the above-described method.

The obtained pellets were put into a vacuum vibration-type reactor VVD-30 (manufactured by Okawara Mfg. Co., Ltd.) and heated to 210° C. After vacuuming, $F_2$ gas diluted to 20 vol % with $N_2$ gas was introduced until the atmospheric pressure was reached. After 0.5 hours from the introduction of the $F_2$ gas, the reactor was once vacuumed, and $F_2$ gas was introduced again. Furthermore, after 0.5 hours, the reactor was vacuumed again, and $F_2$ gas was introduced again. From then on, operation of the above-described $F_2$ gas introduction and vacuuming was continuously carried out once per hour, and a reaction was thus carried out at a temperature of 210° C. for 10 hours. After the completion of the reaction, the reactor was sufficiently purged with the $N_2$ gas to terminate the fluorination reaction. A variety of physical properties other than the content of PPVE were measured on the fluorinated pellets by the above-described method.

The variety of physical properties will be described below.

Formulation: TFE/PPVE=94.4/5.6 (mass %)
MFR: 25.1 (g/10 min)
Melting point: 303° C.
Number of functional groups: Four/$10^6$ C Approximately 5 g of the pellets were placed into a mold (inner diameter: 120 mm, height: 38 mm), melted at 370° C. for 20 minutes by hot plate press and then cooled with water while being pressurized at a pressure of 1 MPa (resin pressure), thereby producing molded articles having a thickness of approximately 0.2 mm. After that, 15 mm×15 mm test pieces were produced from the obtained molded articles.

(Immersion Test in Electrolytic Solution)

Ten of the obtained test pieces and 2 g of an electrolytic solution (dimethyl carbonate (DMC)) were put into a 20 mL glass sample bottle, and the sample bottle was closed with a lid. The sample bottle was put into a constant-temperature vessel at 80° C. and left to stand for 24 to 144 hours, thereby immersing the test pieces in the electrolytic solution. After that, the sample bottle was taken out from the constant-temperature vessel and left to cool to room temperature. Then, the test pieces were taken out from the sample bottle, and the weights of the test pieces were measured. The change ratios (mass %) of the weight of the test piece after immersion to the weight of the test piece before immersion were calculated. The results are shown in FIG. 1.

Figure 2:
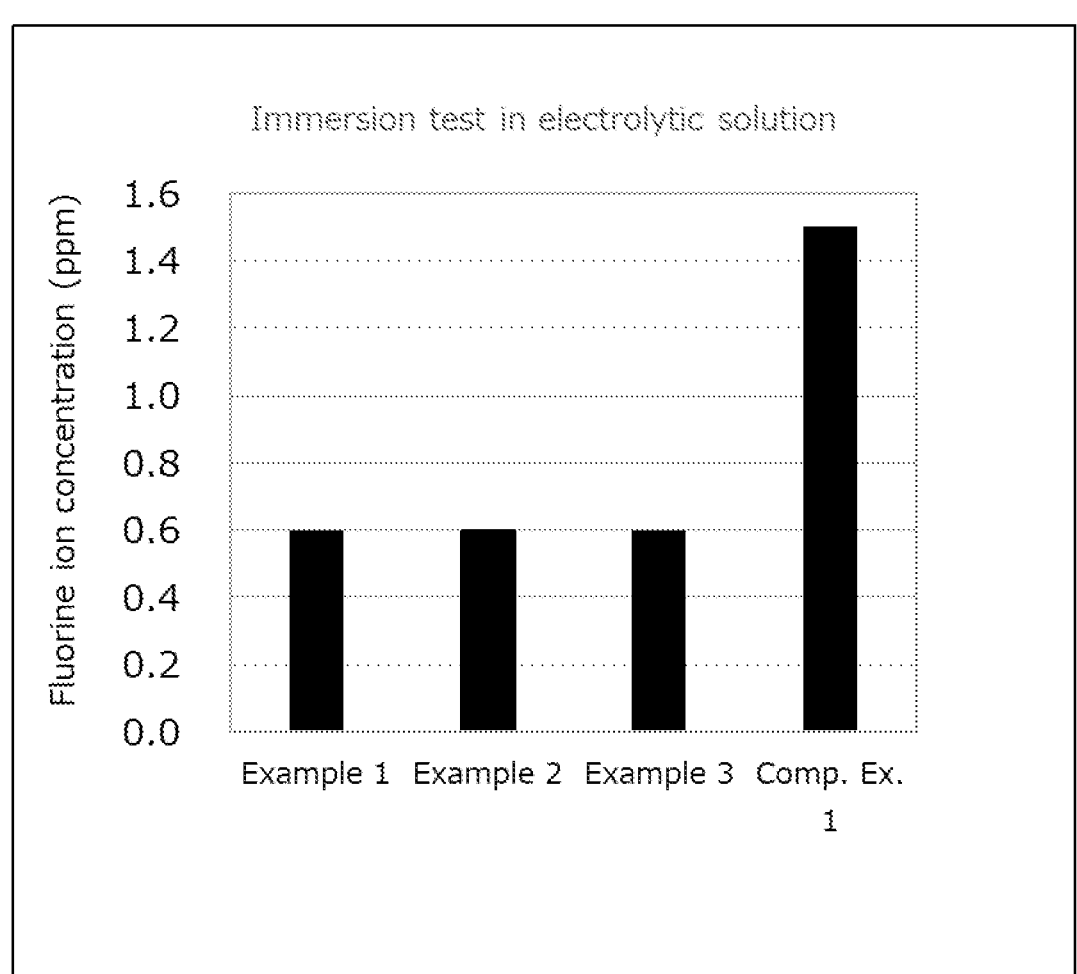
FIG. 2 is a graph showing the concentrations (ppm) of fluorine ions eluted, as measured in the immersion tests of test pieces produced in Examples 1 to 3 and Comparative Example 1 in an electrolytic solution.

Furthermore, the electrolytic solution, which was left after the test pieces were taken out after 144 hours, was dried with an air for 24 hours while the electrolytic solution was still kept in the sample bottle in a room controlled at 25° C., and 2 g of ultrapure water was added thereto. The obtained aqueous solution was transferred to a measurement cell of an ion chromatography system, and the concentration of fluorine ions in this aqueous solution was measured with the ion chromatography system (Dionex ICS-2100 manufactured by Thermo Fisher Scientific). The results are shown in FIG. 2.

(Compression Set Rate (CS))

The compression set rate was measured using a method described in ASTM D395 or JIS K 6262.

Approximately 2 g of the pellets were placed into a mold (inner diameter: 13 mm, height: 38 mm), melted at 370° C. for 30 minutes by hot plate press and then cooled with water while being pressurized at a pressure of 0.2 MPa (resin pressure), thereby producing molded articles having a height of approximately 8 mm. After that, the obtained molded articles were cut, thereby producing test pieces having an outer diameter of 13 mm and a height of 6 mm. The produced test pieces were compressed using a compression device at normal temperature at a compressive deformation rate of up to 25% (that is, the test pieces having a height of 6 mm were compressed to a height of 4.5 mm).

Figure 3:
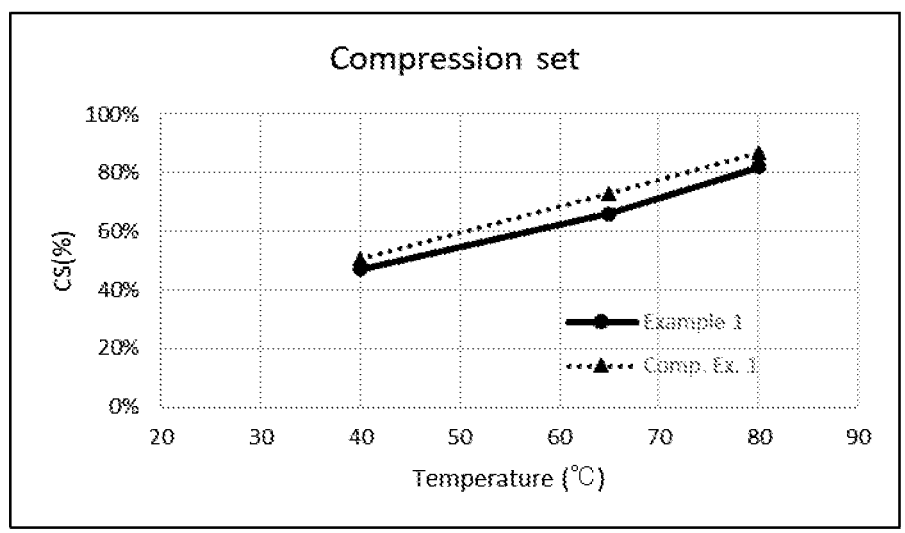
FIG. 3 is a graph of compression set rates (%) at 40° C. to 80° C. of the test pieces produced in Example 1 and Comparative Example 1, plotted relative to the measurement temperatures (° C.) of the compression set rates.

Next, the compressed test pieces were placed still in an electric furnace while being fixed to the compression device, and left to stand at 40° C., 65° C. or 80° C. for 72 hours. The compression device was taken out from the electric furnace, and the test pieces were removed. The resulting test pieces were left to stand at room temperature for 30 minutes, and then the heights were measured. The compression set rates were obtained from the following formula. The results are shown in FIG. 3.

$$\text{Compression set rate } (\%) = (t_0 - t_2)/(t_0 - t_1) \times 100$$

$t_0$: Original height of test piece (mm)
$t_1$: Height of spacer (mm)
$t_2$: Height of test piece removed from compression device (mm)

In the above-described test, $t_0$ was 6 mm, and $t_1$ was 4.5 mm.

Example 2

The following pellets were obtained in the same manner as in a manufacturing method described in Example 2 of Japanese Patent Laid-Open No. 2005-320497.

Figure 4:
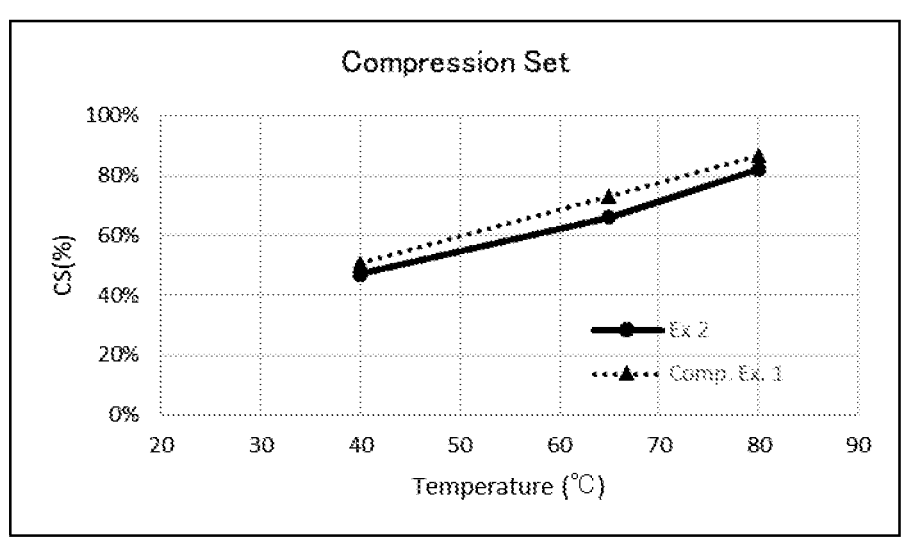
FIG. 4 is a graph of compression set rates (%) at 40° C. to 80° C. of the test pieces produced in Example 2 and Comparative Example 1, plotted relative to the measurement temperatures (° C.) of the compression set rates.

Formulation: TFE/PPVE=94.0/6.0 (mass %)
MFR: 29.0 (g/10 min)
Melting point: 303° C.
Number of functional groups: 40/$10^6$ C Test pieces were produced and an immersion test in an electrolytic solution was carried out using the obtained test pieces in the same manner as in Example 1, except that the above-described pellets were used. The results are shown in FIG. 2. In addition, test pieces were produced and the compression set rates were determined using the obtained test pieces in the same manner as in Example 1, except that the above-described pellets were used. The results are shown in FIG. 4.

Example 3

Fluorinated pellets were obtained in the same manner as in Example 1, except that the amount of pure water was changed to 46.1 L, the amount of PPVE was changed to 2.80 kg, the amount of methanol was changed to 6.10 kg, and 0.075 kg of PPVE was added each time when 1 kg of TFE was supplied to continue the polymerization for 27 hours, thereby obtaining 30 kg of a powder.

The variety of physical properties will be described below.

Figure 5:
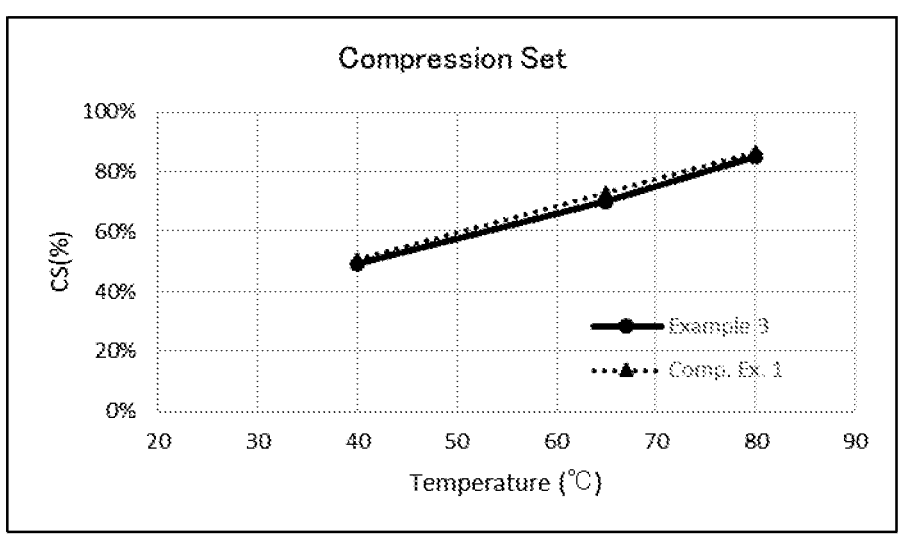
FIG. 5 is a graph of compression set rates (%) at 40° C. to 80° C. of the test pieces produced in Example 3 and Comparative Example 1, plotted relative to the measurement temperatures (° C.) of the compression set rates.

Formulation: TFE/PPVE=93.0/7.0 (mass %)
MFR: 23.0 (g/10 min)
Melting point: 303° C.
Number of functional groups: Four/$10^6$ C Test pieces were produced and an immersion test in an electrolytic solution was carried out using the obtained test pieces in the same manner as in Example 1, except that the above-described pellets were used. The results are shown in FIG. 2. In addition, test pieces were produced and the compression set rates were determined using the obtained test pieces in the same manner as in Example 1, except that the above-described pellets were used. The results are shown in FIG. 5.

Comparative Example 1

The following pellets were obtained in the same manner as in a manufacturing method described in Example 2 of Japanese Patent Laid-Open No. 2009-059690 except that fluorination was not carried out.

Formulation: TFE/PPVE=94.4/5.6 (mass %)

MFR: 26.1 (g/10 min)

Melting point: 303° C.

Number of functional groups: $303/10^6$ C

Test pieces were produced and an immersion test in an electrolytic solution was carried out using the obtained test pieces in the same manner as in Example 1, except that the above-described pellets were used. The results are shown in FIG. 1 and FIG. 2. In addition, test pieces were produced and the compression set rates were determined using the obtained test pieces in the same manner as in Example 1, except that the above-described pellets were used. The results are shown in FIGS. 3 to 5.

FIG. 1 is a graph of the weight changes (mass %) of the test pieces plotted relative to the immersion times (hr) of the test pieces in the electrolytic solution (dimethyl carbonate (DMC)). From FIG. 1, it is found that the test piece containing the TFE/FAVE copolymer having an appropriate MFR and a reduced number of functional groups suppresses an increase in weight and does not easily swell even when immersed in the electrolytic solution.

In addition, the concentrations (ppm) of fluorine ions measured in the immersion test in an electrolytic solutions are shown in FIG. 2. From FIG. 2, it is found that the test pieces containing the TFE/FAVE copolymer having an appropriate MFR and a reduced number of functional groups do not easily allow fluorine ions to be eluted into the electrolytic solution even when immersed in the electrolytic solution.

As shown in FIGS. 3 to 5, the test pieces containing the TFE/FAVE copolymer having a reduced number of functional groups have low compression set rates (CS) at all temperatures of 40° C. to 80° C. compared with the test piece containing the TFE/FAVE copolymer having a large number of functional groups. These results demonstrate that members for a non-aqueous electrolyte battery containing a TFE/FAVE copolymer having a reduced number of functional groups exhibit excellent resistance to compression set in a wide temperature range.

What is claimed is:

1. A non-aqueous electrolyte battery comprising a member, wherein the member is configured to prevent a leakage of liquid or gas of the non-aqueous electrolyte battery or an intrusion of liquid or gas from outside of the non-aqueous electrolyte battery, the member is compressively deformed at a compressive deformation rate of 10% or more, the member comprises a copolymer containing a tetrafluoroethylene unit and a perfluoro (propyl vinyl ether) unit, the number of functional groups per $10^6$ carbon atoms of a main chain of the copolymer is 100 or less, and a melt flow rate of the copolymer is 20 to 30 g/10 minutes, and the number of functional groups is a total number of —CF$=$CF$_2$, —CF$_2$H, —COF, —COOH, —COOCH$_3$, —CONH$_2$, and —CH$_2$OH.

2. The non-aqueous electrolyte battery according to claim 1, wherein the copolymer has a melting point of 295° C. to 320° C.

3. The non-aqueous electrolyte battery according to claim 1, wherein a content of the perfluoro (propyl vinyl ether) unit in the copolymer is 1.0 to 10.0 mass % based on all monomer units.

4. The non-aqueous electrolyte battery according to claim 1, wherein the member comprises a liquid-contact surface with a non-aqueous electrolytic solution.

5. The non-aqueous electrolyte battery according to claim 1, wherein an amount of fluorine ions eluted and detected in an immersion test of the member in an electrolytic solution is 1 ppm or less.

6. The non-aqueous electrolyte battery according to claim 1, wherein the member is an injection molded article.

7. The non-aqueous electrolyte battery according to claim 1, wherein the member is a sealing member or an insulating member.

* * * * *